(12) United States Patent
Sundquist et al.

(10) Patent No.: US 10,943,501 B2
(45) Date of Patent: Mar. 9, 2021

(54) VIRTUAL TEAM SPORT TRAINER

(71) Applicant: SPORTS VIRTUAL TRAINING SYSTEMS INC., Colorado Springs, CO (US)

(72) Inventors: Ted Sundquist, Parker, CO (US); Christopher A. Wiklof, Everett, WA (US)

(73) Assignee: SPORTS VIRTUAL TRAINING SYSTEMS INC, Colorado Springs, CO (US)

( * ) Notice: Subject to any disclaimer, the term of this patent is extended or adjusted under 35 U.S.C. 154(b) by 572 days.

(21) Appl. No.: 15/212,515

(22) Filed: Jul. 18, 2016

(65) Prior Publication Data

US 2017/0046967 A1 Feb. 16, 2017

Related U.S. Application Data

(63) Continuation of application No. PCT/US2015/012324, filed on Jan. 21, 2015.

(60) Provisional application No. 61/929,930, filed on Jan. 21, 2014.

(51) Int. Cl.
| | |
|---|---|
| G09B 19/00 | (2006.01) |
| G09B 9/00 | (2006.01) |
| G09B 5/06 | (2006.01) |
| A63B 69/00 | (2006.01) |

(52) U.S. Cl.
CPC ............... *G09B 9/00* (2013.01); *A63B 69/00* (2013.01); *G09B 5/065* (2013.01); *G09B 19/0038* (2013.01); *A63B 2243/007* (2013.01)

(58) Field of Classification Search
None
See application file for complete search history.

(56) References Cited

U.S. PATENT DOCUMENTS

| | | | | |
|---|---|---|---|---|
| 5,398,936 | A * | 3/1995 | Kluttz | A63B 24/0021 |
| | | | | 434/252 |
| 5,882,204 | A | 3/1999 | Iannazo et al. | |
| 6,322,455 | B1 * | 11/2001 | Howey | A63B 24/0003 |
| | | | | 273/461 |
| 7,457,439 | B1 | 11/2008 | Madsen et al. | |
| 7,980,998 | B2 | 7/2011 | Shemesh et al. | |
| 8,248,462 | B2 | 8/2012 | Peterka et al. | |
| 8,512,043 | B2 | 8/2013 | Choquet | |
| 8,527,625 | B2 | 9/2013 | Dolbier et al. | |
| 8,597,095 | B2 | 12/2013 | Crowley et al. | |
| 8,615,383 | B2 | 12/2013 | Dobbins et al. | |
| 8,622,832 | B2 | 1/2014 | Marty et al. | |
| 8,690,655 | B2 | 4/2014 | Meyer et al. | |
| 8,702,516 | B2 | 4/2014 | Bentley et al. | |
| 2003/0203757 | A1 | 10/2003 | Chanda et al. | |
| 2004/0266535 | A1 | 12/2004 | Reeves | |

(Continued)

OTHER PUBLICATIONS

PCT International Search Report and Written Opinion of PCT Application No. PCT/US2015/012324 dated Jun. 18, 2015.

(Continued)

*Primary Examiner* — Bruk A Gebremichael
(74) *Attorney, Agent, or Firm* — Welsh Flaxman & Gitler LLC

(57) ABSTRACT

A team sport training system is configured to provide an immersive simulation of at least a portion of an opponent team play responsive to real actions of a player.

19 Claims, 11 Drawing Sheets

(56) References Cited

U.S. PATENT DOCUMENTS

| | | |
|---|---|---|
| 2006/0017654 A1 | 1/2006 | Romo |
| 2006/0116185 A1 | 6/2006 | Krull |
| 2006/0189386 A1* | 8/2006 | Rosenberg .............. A63F 13/12 463/37 |
| 2006/0281061 A1 | 12/2006 | Hightower et al. |
| 2008/0220941 A1 | 9/2008 | Shaw et al. |
| 2009/0091583 A1 | 4/2009 | McCoy |
| 2012/0262558 A1* | 10/2012 | Boger ................ G02B 27/0093 348/61 |
| 2013/0189656 A1 | 7/2013 | Zboray et al. |
| 2013/0317634 A1 | 11/2013 | French et al. |
| 2013/0345839 A1 | 12/2013 | Stephens et al. |
| 2014/0045154 A1 | 2/2014 | Hook et al. |
| 2014/0080638 A1 | 3/2014 | Feng et al. |
| 2014/0200059 A1 | 7/2014 | Thomas et al. |
| 2014/0212004 A1 | 7/2014 | Suk |

OTHER PUBLICATIONS

Reilly, Eon Reality Sports Football Simulator Sneak Preview. Jun. 7, 2013 [retrieved on May 11, 2015]. Retrieved from the Internet:https://www.youtube.com/watch?v=0-MukKsQtNg, entire document.

Eon Sports. SIDEKIQ Introduction Virtual Reality Football Training. Apr. 12, 2013 [retrieved on May 11, 2015]. Retrieved from the Internet ,URL:https://youtube.com/watch?v=_IFzhiSSXCA. entire document.

* cited by examiner

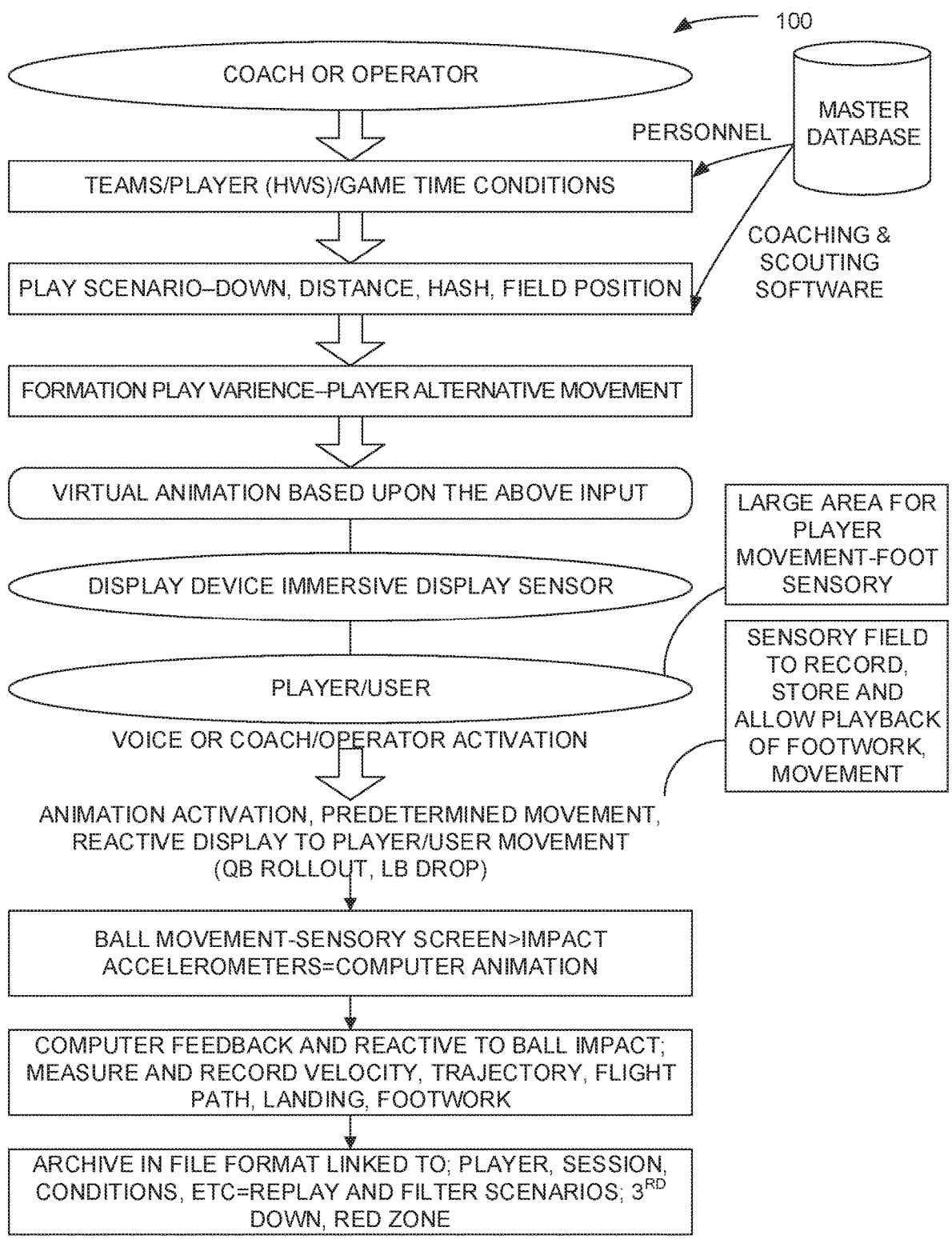

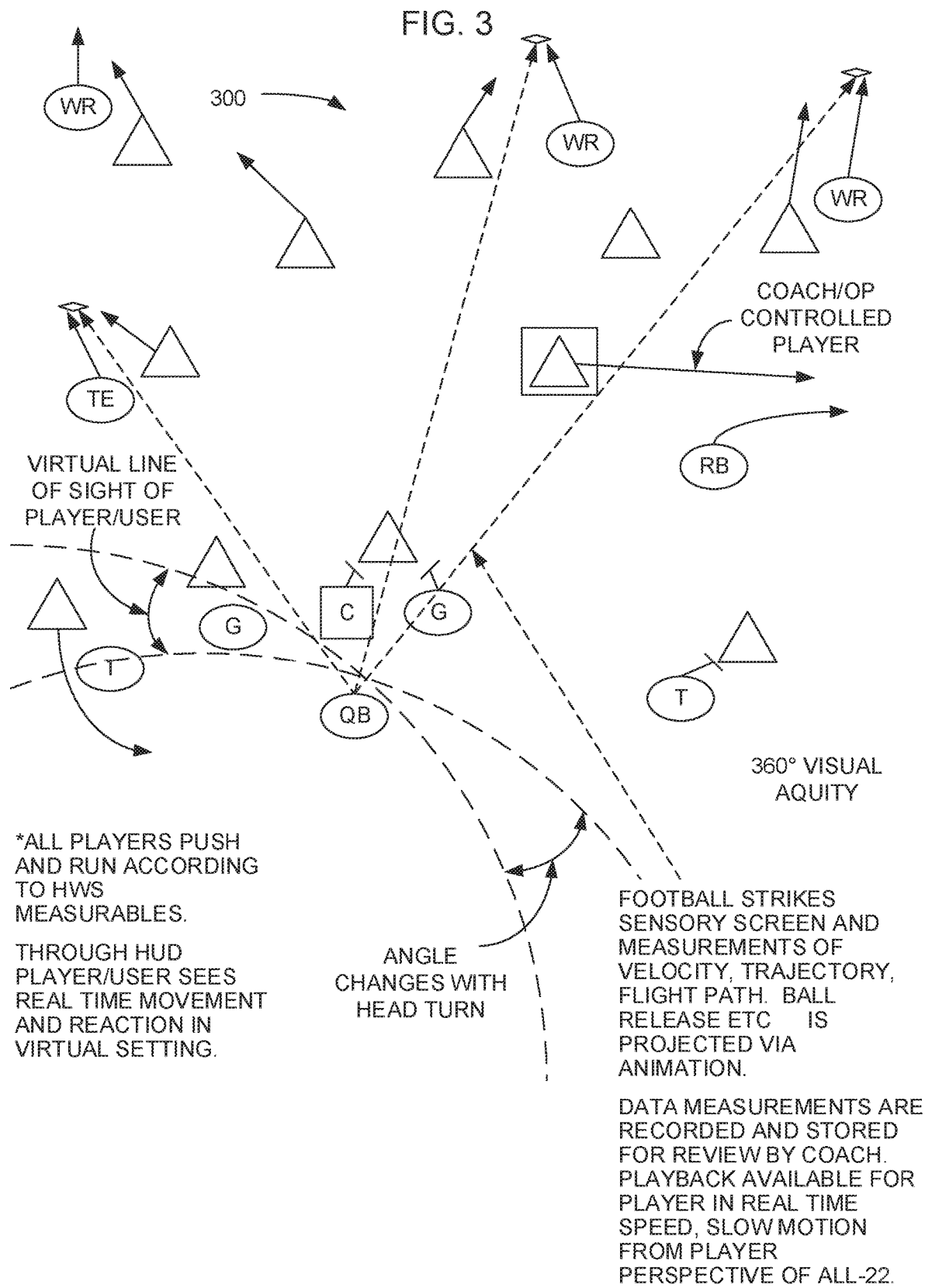

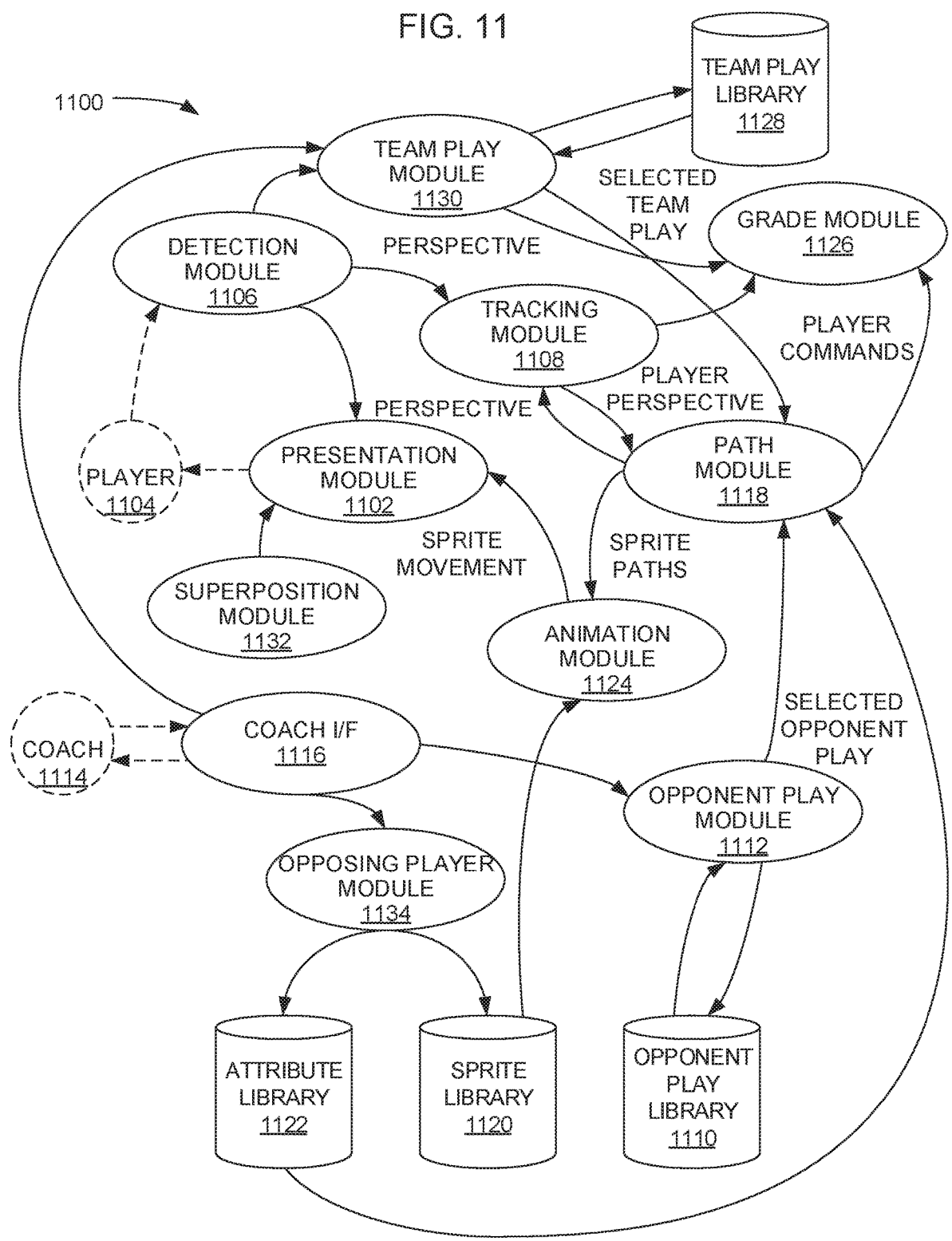

VIRTUAL TEAM SPORT TRAINER

CROSS REFERENCE TO RELATED APPLICATION

The present application is a U.S. Continuation Application which claims priority benefit under 35 U.S.C. § 120 (pre-AIA) of co-pending International Patent Application No. PCT/US2015/012324, entitled "VIRTUAL TEAM SPORT TRAINER," filed Jan. 21, 2015; which application claims priority benefit from U.S. Provisional Patent Application No. 61/929,930, entitled "VIRTUAL FOOTBALL TRAINER," filed Jan. 21, 2014; each of which, to the extent not inconsistent with the disclosure herein, is incorporated by reference.

BACKGROUND

Much of the preparation in the game of football involves repetitive drilling by running plays against a scout team opponent (through initial alignment, formation, and then reactive movement) and the resulting reaction a player/players should implement in order to achieve a successful play. NFL and college coaches are challenged by time constraints in training players in real time repetitions of actual play scenarios without risking injury or not adhering to practice time limitations.

Most backup and young players must watch from the sidelines or review via video playback from a sideline or end zone camera, referred to as an All-22 perspective, and not from a (first person) positional viewpoint. An analogy is learning how to drive by watching someone else drive a car while standing alongside the road. Accordingly, with present day drill capacity, a non-starting player may not receive any repetitions at his position. Moreover, even starting players drill less than total available drill capacity due to logistical limitations of even the most organized football programs.

What is needed is a technology that can increase football training repetitions without incurring risk of injury and/or without exceeding practice time limitations.

SUMMARY

According to an embodiment, a team sport trainer provides psychological and physiological training similar to repetitions against a scout team. According to another embodiment, a virtual team sport trainer provides training superior to repetitions against a scout team by more accurately simulating the most probable actions of actual players on an opponent team compared to the actions of scout team players. The virtual team sport trainer can provide first person perspective and feedback intended to hone reactive instincts between mind-body connections as a result of seeing a visual stimulus and reacting with a physical response to the stimulus. According to an embodiment, a virtual football trainer leverages advances in computing speed and pipelined processing architectures, in immersive display devices, including head set displays such head-mounted display (HMD) and head-up display (HUD) display technology with wireless data coupling to a computer, and in continuing advances in graphic animation such as first person game animation.

Gaming animation has reached a sufficiently realistic visual level that professional coaches, trainers, and players will find utilizing such a tool for preparation and development of football players more acceptable. Disclosed herein are software advances that allow for animated players to react realistically to movement of the ball (e.g., pursuit, tackles, downfield blocks) and actions of the player (i.e., the live player who receives training using the present system) to give the player a better sense of a play outcome as a result of his detected actions.

Video gaming does not account for the many actual game plan combinations used by real NFL or collegiate coaches, along with variations of these combinations through shifts, motions, blitzes, disguised blitzes, coverages and other alternative movements. According to embodiments, systems and methods described herein provide training relevant to historical tendencies of a selected opponent team.

Displaying the reaction of a simulated opponent team will be helpful to a player (especially for positions responsible for pre-snap calls such as the quarterback, center, and defensive backfield positions) relative to prior art diagrams and/or orally presented scouting reports. For a quarterback, for example, the ability to throw the football to the simulated intended target will give the player a much clearer indication of his performance and make clear necessary adjustments to achieve a successful play against the simulated opponent team. According to embodiments, the system can display to the player the release of the football through the display device, either as a live image overlaid onto the simulation or by detecting and simulating the ball position. As described herein, the system can detect the real ball trajectory and responsively animate a simulated pass according to velocity and angle of release of the real ball. The animated pass can then be displayed to the player, who can watch the path of the ball to the simulated receiver, along with simulated opponents reacting to the throw. According to an embodiment, the system can detect player gaze direction (e.g., corresponding to the direction in which the player's head points) relative to the simulation and the animated opponent defensive backs can adjust their coverage in real time responsive to the gaze direction, thus simulating the tendency for a real opponent team to react to "staring down" the quarterback's intended receiver.

Simulation systems and methods described herein, according to embodiments, will also give the coach a greater opportunity to provide constructive feedback to the player through replay analysis of the player's reaction, subsequent action, and the computer simulated opponent team response. Such feedback can optionally be based on past-recorded tendencies of a particular opponent team in the simulated situation.

According to an embodiment, a method for training a player of a team sport includes the steps of providing, to the player, an immersive computer display operatively coupled to a computer; receiving, from a portion of a sensing circuit operatively coupled to the computer, a location and gaze direction of the player relative to a physical practice field, the location and gaze direction collectively defining a perspective; and generating, with the computer, an animation including respective team and opponent team pre-play alignments. The animation is registered to the physical practice field. The animation including pre-play alignments is displayed to the player via the immersive computer display. A command from the player to start play is received from the sensing circuit. Responsive to the command to start play, at least one simulated team player and at least one simulated opponent player are animated to respectively execute a selected team play and a selected opponent play. While the player executes real physical movements on the practice field corresponding to the called team play, a first person view of the animation is output to the player via the immersive computer display corresponding to a sequence of sensed perspectives.

According to an embodiment, a non-transitory computer readable medium carries computer readable instructions configured to cause a computer to execute a method including the steps of driving an immersive computer display operatively coupled to the computer; receiving, from a portion of a sensing circuit operatively coupled to the computer, a location and gaze direction of the player relative to a physical practice field, the location and gaze direction collectively defining a perspective; and generating, with the computer, an animation including respective team and opponent team pre-play alignments. The computer readable instructions are further configured to cause the computer to register the animation to the physical practice field, display the animation including pre-play alignments to the player via the immersive computer display, and receive, from the sensing circuit, a command from the player to start play. The computer readable instructions are further configured to cause the computer to, responsive to the command to start play, animate at least one simulated team player and at least one simulated opponent player to respectively execute a selected team play and a selected opponent play; and while the player executes real physical movements on the practice field corresponding to the called team play, outputting a first person view of the animation to the player via the immersive computer display corresponding to a sequence of sensed perspectives.

According to an embodiment, a team sport training system includes computer-executable instructions carried by a non-transitory computer-readable medium. The computer-executable instructions include a presentation module configured to output a first person view of an animation of an opponent football team to a player, the first person view corresponding to an instantaneous player perspective. A detection module is configured to receive location and gaze direction of the player, the location and gaze direction together comprising the perspective, and output the instantaneous perspective to the presentation module. The detection module can be further configured to receive player commands such as verbal and non-verbal commands corresponding to play changes responsive to an animated opponent team alignment. A tracking module is configured to receive a sequence of the player perspectives from the detection module. An opponent play module is configured to receive an opponent team play call from a coach via a coach interface, select the called opponent play and corresponding opponent team player alignments from an opponent play library, and output the selected opponent play and opposing player alignments to a path module. The path module is configured to determine animated opponent player paths (e.g., as sprite paths) responsive to the opposing player alignments, the selected opponent play, opponent player tendencies and attributes, and the player commands. An animation module is configured to receive the opponent player (sprite) paths from the path module and output animated movements corresponding to the opponent player (sprite) paths to the presentation module. The presentation module may display a portion of a large video space output by the animation module corresponding to the instantaneous gaze direction of the player.

According to an embodiment, a method for providing football training, includes the steps of outputting, with a head-mounted display (HMD), a first person view including an animation of at least a portion of an opponent football team to a player; detecting, with one or more sensors, a location on a practice field and a gaze direction of the player, the location and gaze direction together defining a first person perspective corresponding to the first person view; and generating, with a computer operatively coupled to the HMD and the one or more sensors, the animation of at least a portion of the opponent football team responsive to the first person perspective.

According to an embodiment, a non-transitory computer readable medium carries computer instructions configured to cause a computer to perform the steps of defining player position attributes corresponding to a player's offense teammates and opponent team defense members; receiving an offensive play selection to be run by a model including the player's offense; receiving a selection of a defense play to be run by the model; for each of a sequence of time steps or decision points driven by a real time clock, stepping the model to determine exclusive space locations of 21 or more individual sprites respectively corresponding to the modeled ones of the player's offense teammates and the opponent team defense members, wherein the model is structured to output locations from weighted functions of each offensive team path and each defensive team path, the paths being determined according to the play selections and according to the position attributes of respective player's offense teammates and opponent team defense members; reading a respective animation sequence corresponding to the current step of a plurality of the sprites corresponding to at least a portion of the player's offense teammates and the opponent team defense members; and outputting, on an immersive display device in real time, at least a portion of the plurality of animations as scaled sprites at respective ones of a corresponding at least a portion of the 21 or more individual sprites.

BRIEF DESCRIPTION OF THE DRAWINGS

FIG. 1 is a diagram corresponding to a virtual football trainer, according to an embodiment.

FIG. 3 is a diagram illustrating potential scenarios that develop after sensing a pass executed by a player, according to an embodiment.

FIG. 11 is a state diagram of a computer program and related data libraries configured to provide a football training experience to a football player, according to an embodiment.

DETAILED DESCRIPTION

Figure 2A:
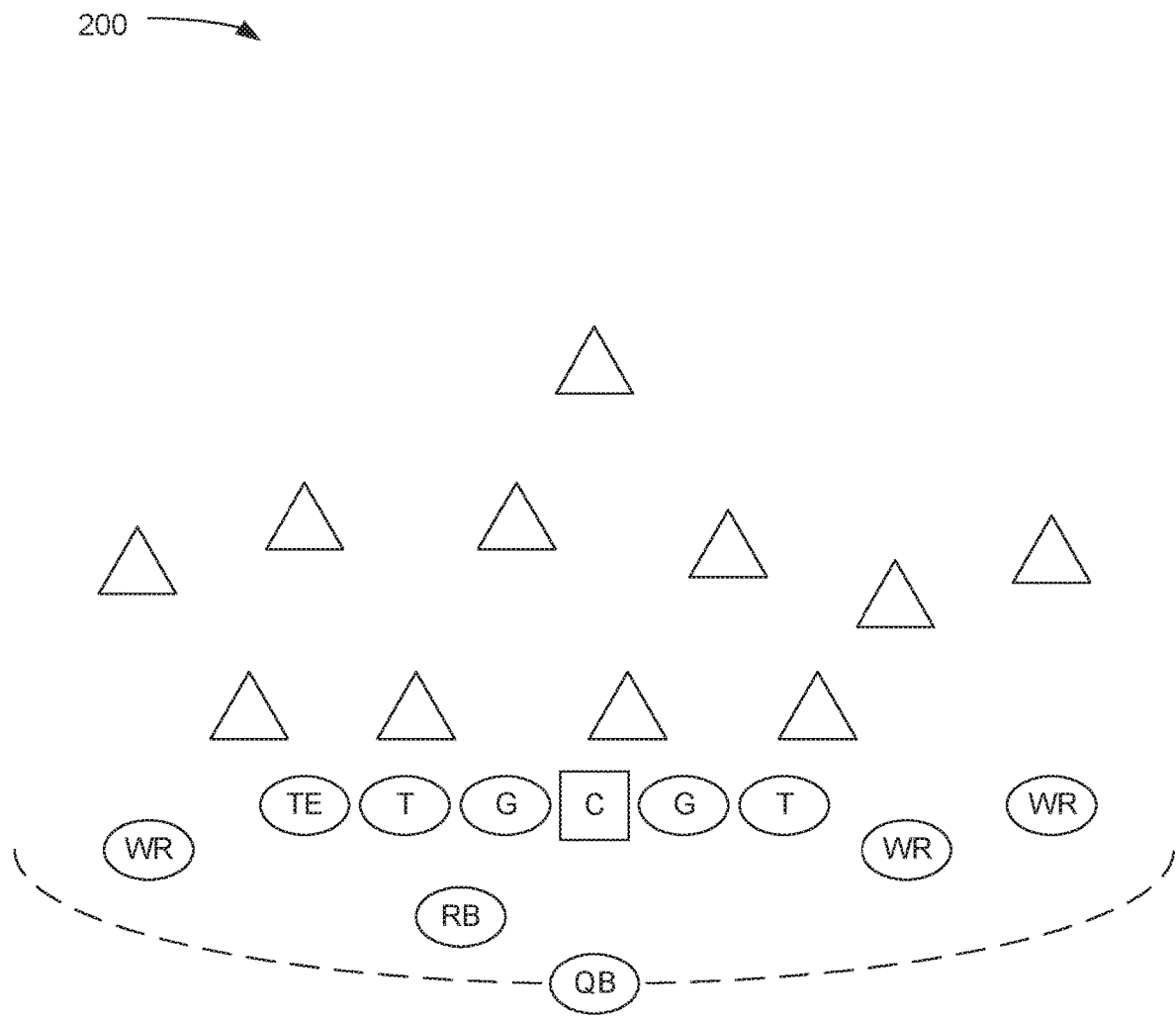
FIG. 2A is a diagram of an example of a pre-snap offensive formation and a defensive alignment chosen by a coach/from a virtual football trainer database for use in the simulation environment, according to an embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 is a chart of a virtual football trainer 100, according to an embodiment. The virtual team sport trainer 100 allows for computerized measurements and data analysis to be collected and stored regarding ball velocity, trajectory, flight path, and landing point, with calculations of release time, drop back speed, snap to kick, or any other time measured reaction.

Figure 2B:
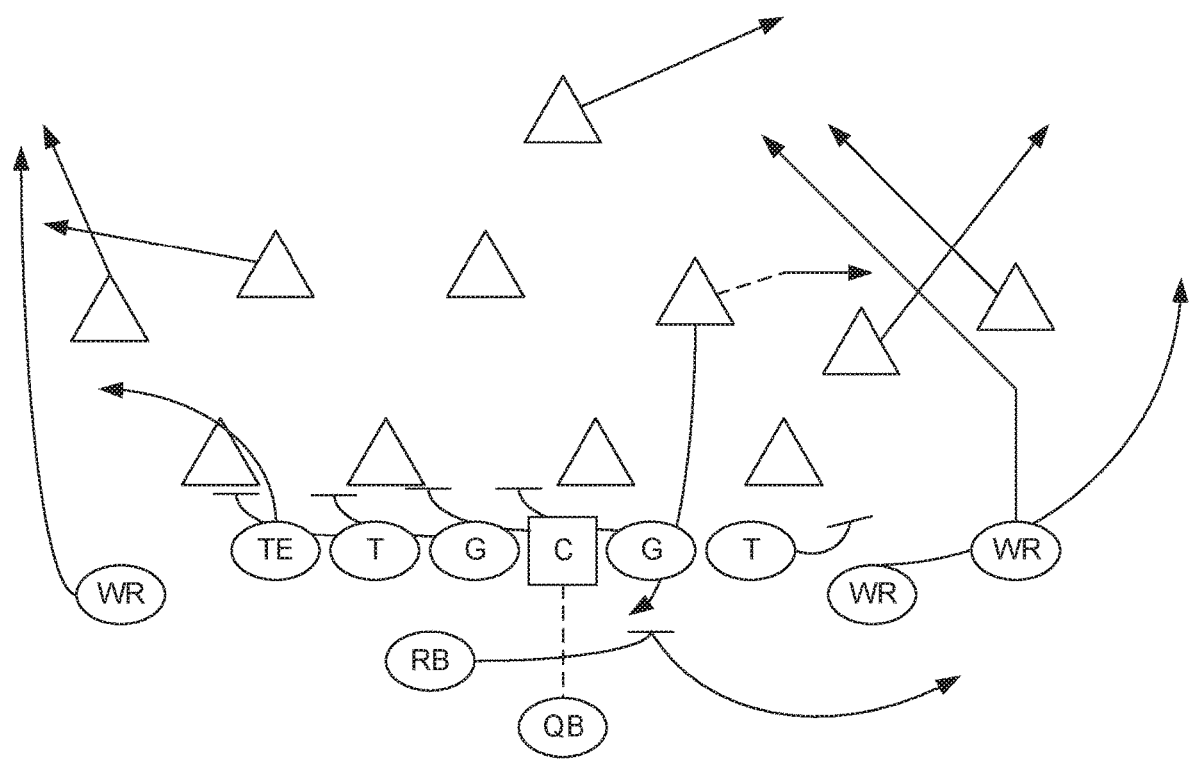
FIG. 2B is a diagram illustrating examples of offensive and defensive animated player movements generated by a path module beginning with the football snap, according to an embodiment

FIG. 2A is a diagram of an example of a pre-snap offensive formation and a defensive alignment 200 chosen by the coach from a virtual football trainer database for use in the simulation environment, according to an embodiment. FIG. 2B is a diagram illustrating an example of offensive and defensive animated player movements 200, generated from the database beginning with the football snap, according to an embodiment. Simulated players can be observed through a display device that can be programmed with predetermined formations and plays set into an operative computer database system that feeds the visual display. Players will move in relation to individual data measurables of height, weight, speed, and other athletic indicators input into the database in relation to players in the NFL or other level of competitive football. The 21 animated players outside of the player will not move in conjunction with and/or in relation to each other at the same speed and quickness, but rather in relation to the athletic ability of corresponding real opponents and teammates.

FIG. 3 is a diagram illustrating potential scenarios 300 developing in conjunction with a pass executed by the player, player movements and gaze, and sensing of the pass trajectory, according to an embodiment. Virtual animation carries forward the flight of the ball after it is released from the player and hits the screen. The player can observe his physical action of the throw or kick with realistic and real time animated reaction of opposing players displayed through a headset or digital screen.

Referring to FIGS. 2A, 2B and 3, real game-type scenarios can be downloaded through the coach and/or operator or from linked coaching software or other game planning software. Preset formations and plays can guide the virtual team and opponent prior to the throw, kick, or eventual indication of the coach/operator that the player movement has ceased (as perhaps in the movement of a linebacker or safety to position himself) and the computer will take over any reactive animation from the data input into the play and the reaction of the player at that point.

The resulting animated play will give the player a realistic indication of whether his reaction was correct or not; completed pass vs. incomplete pass, made vs. missed field goal, correct body placement in relation to simulated oncoming play, etc.

An evaluative tool will be used to grade the reaction of the player to predetermined routes/movement, to the flight of the ball, movement of other players, etc., used in a simulation. The simulation can be recorded and available for immediate feedback.

A platform or field on which the player stands will need to be wide and deep enough to simulate the dimensions of a moving pocket for a quarterback. That width would extend beyond the traditional "tackle box" and be at a minimum of 10 yards (30') deep. The sensory screen will be in a parabolic display reference to the player to allow for throws immediately perpendicular (180*), if not slightly behind, the positioning of the quarterback at his deepest drop in the simulated pocket.

The platform has a sensory recording of foot placement/movement and can be recorded in conjunction with each play. This allows for a "sky view" 2-dimensional viewing of footwork by the player for the coach to review and use with ball placement. Such a tool gives the coach a "mapping" of the position of the player in relation to the timing of the play, position of opponent, and then he can quickly point out depth, drifting, replacement steps, etc. that are vital coaching tips to the correct execution of the simulated play.

Flight paths and corresponding footwork can be recorded with foot mapping, stored, and linked with the session's display of play sequence, formation, play, down-distance-hash, defense, result, or any other component (data field) relative to a football play. The data can then be filtered via single or multiple data fields and replayed via a query at the discretion of the coach/operator. The view can be from the player perspective, another opposing player's reactive view back to the player, a teammate's reactive view back to the player, or All-22.

Figure 4:
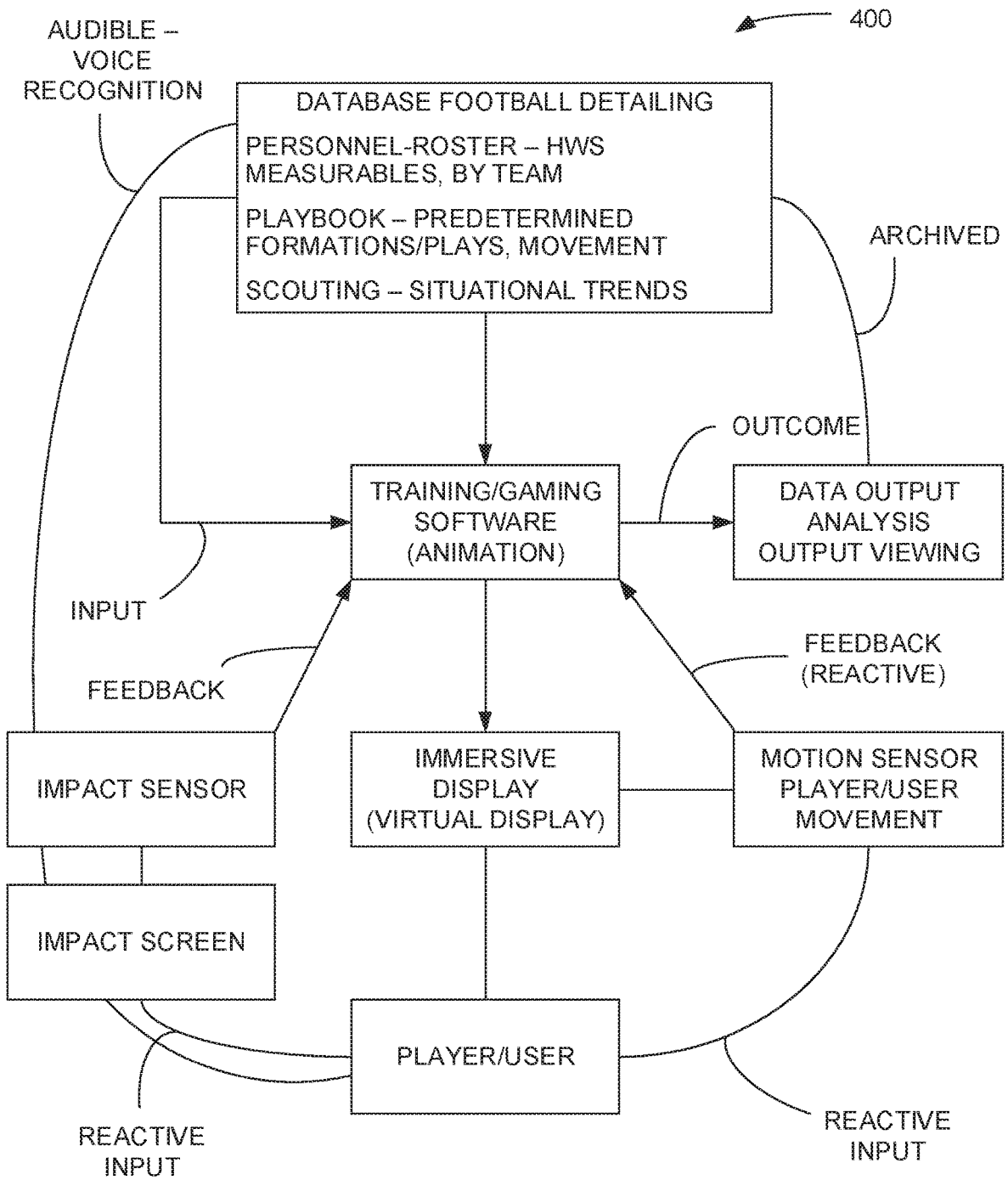
FIG. 4 is a simplified diagram of an example of a virtual football trainer hardware arrangement for presenting an immersive football player training environment, according to an embodiment.

FIG. 4 is a diagram of an example of a virtual football trainer hardware arrangement 400 for presenting an immersive football player training environment, according to an embodiment.

Figure 5:
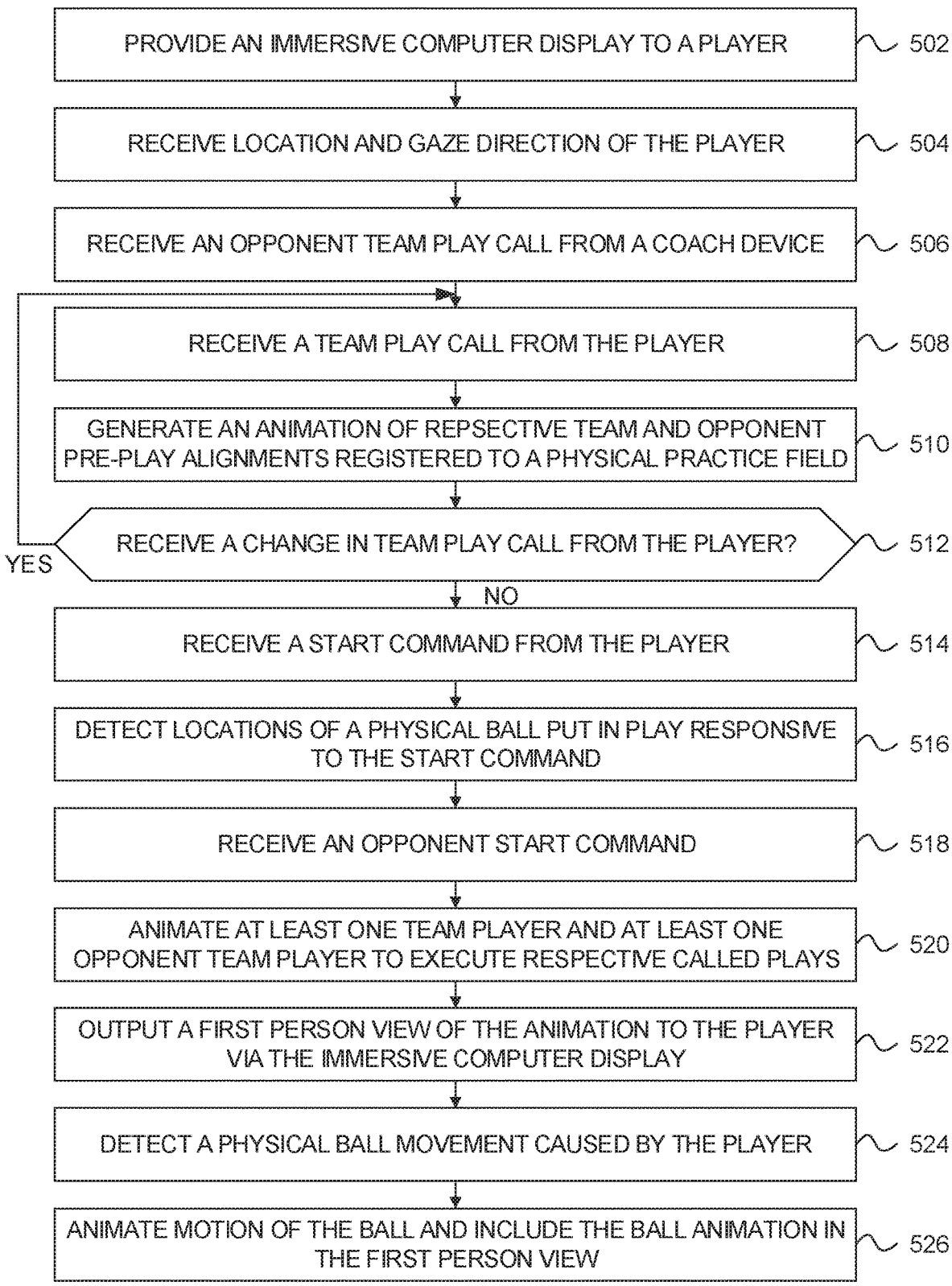
FIG. 5 is a flow chart showing a method for training a player for playing a team sport, according to an embodiment.

FIG. 5 is a flow chart showing a method 500 for training a player to play a team sport, according to an embodiment. Particularly, the method 500 of FIG. 5 is useful for training one or more players in a team sport that uses an object such as a ball or puck. For example, the method 500 of FIG. 5 can be used to train an American football player, such as to play the quarterback position.

The method 500 begins at step 502, which includes providing, to a player, an immersive computer display operatively coupled to a computer. For example, the immersive display can include a head mounted display or helmet mounted display (HMD) that is worn by the player. One example of a HMD suitable for use in the method 500 is an Oculus Rift HMD, available from Google. Another HMD that may be used is the Sony Glasstron. Now discontinued, the Sony Glasstron is available used at online auction sites, for example. Other suitable HMDs are in development.

Next, in step 504, a location and gaze direction of the player relative to a physical practice field is received from a portion of a sensing circuit operatively coupled to the computer. According to an embodiment, the portion of the sensing circuit is included in the immersive computer display. According to another embodiment, the portion of the sensing circuit can include a plurality of video cameras, radars, radio transmitters, and/or radio receivers disposed at known positions around the periphery of the practice field. The location and gaze direction collectively define a perspective.

In step 506, an opponent team play call is received from a coach device operatively coupled to the computer. Opponent team plays can be selected from a set of generic defensive or offensive plays, or alternatively the opponent team plays can include a set of probable sets, alignments, coverages, offensive plays, etc. that are the product of opponent scouting. Optionally, receiving the opponent team play selection from the coach device in step 506 can include receiving a selection of an opponent play from an artificial intelligence module, rather than from a physical person working as a coach.

In one embodiment, the coach device includes a portable electronic device such as an iPhone® smart phone or iPad® tablet computer available from Apple, Inc. of Cupertino Calif. or an Android® smart phone or tablet, available from various manufacturers. The portable electronic device can include an application operable to receive coach inputs and/or display simulation outputs to a coach. In another embodiment, the coach device includes an immersive display upon which animations described below can be displayed. According to an embodiment, the animations are displayed relative to the coach's perspective. Optionally, the coach can select the animations to be displayed relative to the player's perspective. In another embodiment, the coach device includes a conventional desktop or portable computer.

Proceeding to step 508, a team play call is received from the player via a portion of the sensing circuit operatively coupled to the computer. In one example, the team play call is received via a microphone operatively coupled to the immersive display. In another example, the team play call is received via a parabolic microphone disposed adjacent to the practice field. In another example, the team play call may include a series of gestures, and the gestures may be received via one or more video cameras or other suitable sensors disposed adjacent to the practice field.

In step 510, the computer generates an animation including respective team and opponent team pre-play alignments. Various approaches for generating training animations are described elsewhere herein. The animation is registered to the physical practice field. In other words, the animation is fixed in space and at 1:1 scale such that each animated element has a corresponding physical location on the physical practice field. The technology to register the animation is similar to that used to display first down lines on a television broadcast of an American football game or to broadcast an image including virtual advertising on a sports field that does not include real advertising indicia. Image and animation registration technology is known to those skilled in the art.

The pre-play alignments can include movements such as shifts or motion that can be used to decipher a disguised opponent team called play or set.

Step 512 is a decision step. It is contemplated that one particular value of the player training system described herein is to train a position player (such as an American football quarterback) to recognize opponent sets and alignments (including disguises and shifts intended to confuse the position player), such that the player may be trained to call an alternative team play selected to defeat an opponent play associated with a particular set or alignment. Similarly, a defensive play caller, such as a safety or linebacker in American football may be trained to shift from a previously called defense into a different defense calculated to improve the chances of limiting yardage gained from the formation shown by the offense, or even to call a time out if presented with a particular combination of called defense and offensive formation. Accordingly, at least in some team sports, the pre-play alignment animation generated in step 510 can be an important training tool.

If, at step 512 the player chooses to call an alternative play (an act commonly referred to as "calling an audible" in American football), the method 500 loops back to step 508. According to an embodiment, upon receiving a new call in step 508, in subsequent step 510 the (player's) team is animated to shift into a new formation corresponding to the new play. According to an embodiment, the coach can input a different opponent play or alignment, and subsequent step 510 includes animating a movement of the opponent team into the new set or alignment. Additionally or alternatively, artificial intelligence (AI) can cause the opponent team to be animated to shift into a different set or alignment and/or run a different play responsive to the newly received team play call and subsequent animated team shift.

Proceeding to step 514, a command from the player to start play is received from the sensing circuit. According to an embodiment, the command is in the form of an audible command. In such a case, the sensing circuit can include a microphone that receives the audible command. The computer can decode the audible command using voice recognition technology and responsively begin to execute step 520, described below. In another embodiment, the command can include a physical act such as skating past a predetermined location (e.g., in the case of hockey), dribbling or passing a game ball (e.g., in the case of basketball or soccer), or the like. In another embodiment, the command from the player can include waiting for a predetermined amount of time with no uttered command. In other words, the start command received in step 514 can be adapted to a variety of utterances, actions, or non-actions, depending on what sport or what situation the coach is desirous of simulating.

Optionally, step 514 can be preceded by a "hard count" intended to draw an opponent offside. According to an embodiment, opponent team AI or a coach command can cause a simulated opponent player to jump if the "hard count" is determined or believed to be especially effective.

According to embodiments, the method 500 proceeds to step 516 wherein the location and movement of a physical play object (such as a ball or puck) is detected.

Optionally, the method can include a step 518, wherein an opponent start command is generated or received, separate from the start command received from the player. For example, this can be used to cause a realistic delay in opponent team response to player team action. In one embodiment, the opponent start command is received from the coach device, which may be manually activated by the coach. In another embodiment, step 518 occurs responsive to detected movement of the physical play object in step 516. In still other embodiments, step 518 is omitted, and the opponent team play starts simultaneously with the player's team start.

Step 520 is performed responsive to the command to start play received in step 514, and includes animating at least one simulated team player and at least one simulated opponent player to respectively execute the called team play and called opponent play. Various approaches are contemplated for animating the simulated team players. In one approach, the animation is predetermined. The computer simply plays the predetermined animated movements and actions of one or more team players and one or more opponent players according to the respective called team and opponent plays.

In another approach, the animation is determined step-wise according to detected ball movement and/or detected player location. In another approach, referred to herein as hybrid logic, the computer plays animation segments and selects new segments at intervals, depending on sensed variables, at instances referred to as decision points.

In step 522, while the player executes real physical movements on the practice field corresponding to the called team play, the computer causes output a first person view of the animation to the player via the immersive computer display corresponding to a sequence of sensed perspectives. Since the animation is registered to the practice field, this causes the view displayed to the player to change in a realistic way that ideally corresponds to what the player will see in a real game under a similar set of circumstances.

Referring to steps 516 and 524, movement of a physical play object (e.g., puck, ball, football) caused by the player is detected by the sensing circuit. In addition to embodiments of the sensing circuit described above (which may include disparate elements such as cameras, microphones, radars, etc. across several physical packages), the play object can be equipped with a transceiver configured to detect respective timing of signals received from at least four fixed position transmitters, calculate a "GPS-like" location from the signal timing, and transmit the calculated location moment-by-moment to the computer. Alternatively, the computer may be "blind" to the location of the play object, but the coach can input responses to the play object location.

According to an embodiment, following step 524, the computer animates the play object such that, if the player's gaze is directed appropriately, the animated play object appears in the first person view.

According to an alternative embodiment, the real play object is detected using a bore-sighted camera mounted on or adjacent to a HMD immersive display. The HMD can include logic to superimpose the animation over fixed objects such as field turf and walls adjacent to the practice field, but to superimpose dynamic objects such as the play object over the animation. Superposition of the animation over fixed objects can operate similarly to color key technology used in video production. As with color key, the play object represents a dynamic object that is not blanked by the animation. In this way, the player sees the actual trajectory of the ball or puck, and possible processing latency does not cause a mismatch between actual play object location and animated play object location.

Figure 6:
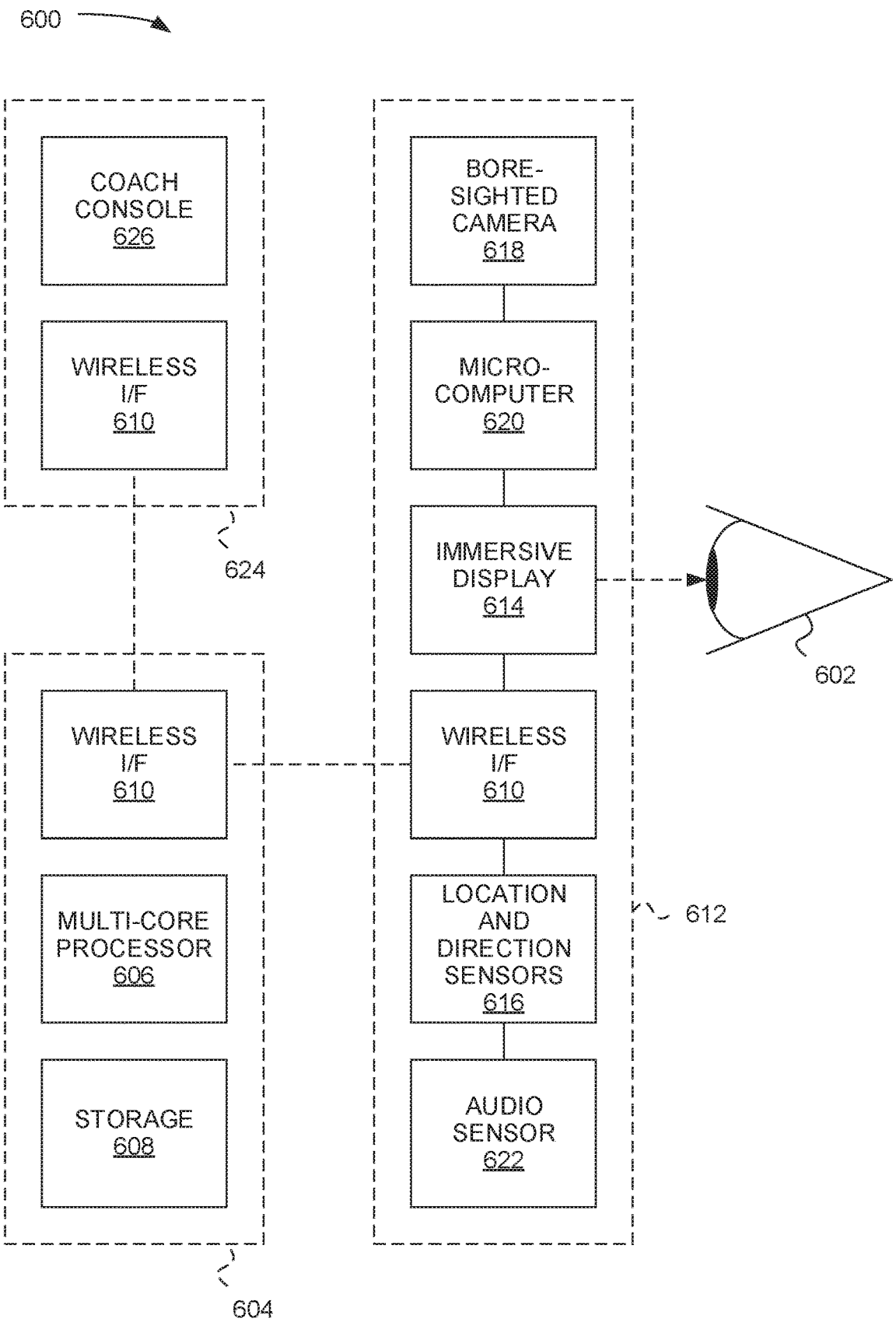
FIG. 6 is a block diagram showing a hardware arrangement for presenting an immersive team sport training environment to a player, according to an embodiment.

FIG. 6 is a block diagram showing a hardware arrangement 600 for presenting an immersive team sport training environment to a player's eye 602, according to an embodiment. The team sport training system 600 includes computer-executable instructions, corresponding to software modules described below, carried by a non-transitory computer-readable medium. The team sport training system 600 includes a computer 604 configured to execute at least a portion of the computer-executable instructions.

The computer 604 can include a multi-core processor 606, computer readable non-transitory media storage 608, and a wireless interface 610. The computer 604 can be configured to execute at least a portion of the computer-readable instructions described herein. An immersive display apparatus 612 can include an immersive display 614 configured to output the first person view to the player's eye 602. The immersive display apparatus 612 can include a real time location tracker and a real time gaze tracker, or location and detection sensors 616 and an occluded head-mounted display 614. The immersive display apparatus 612 can further include a video camera 618 bore-sited to the occluded head-mounted display 614.

The immersive display apparatus 612 can include a micro-computer 620 including an image processor. The micro-computer 620 can be configured to execute computer instructions corresponding to a presentation module of the software (described below).

According to embodiments, it can be important for gaze direction to be properly registered to the player's head movements. If there is a perceptible lag in panning of the immersive image relative to the real direction of the player's head, such lag can be distracting and/or can induce motion sickness. In an embodiment, panning of the animated image is performed locally, in the immersive display apparatus 612. An animation module (e.g., see 1124, FIG. 11) can output an image larger in extent than the angular range produced by the immersive display 614. A local micro-computer 620 configured as an image processor receives angular information from the location and direction sensors 616, and selects a portion of the image from the animation module corresponding to the current gaze direction.

The immersive display apparatus 612 can further include an audio sensor 622 configured to receive audible play calls made by the player. The audio sensor 622 can include a microphone and an analog-to-digital converter configured to convert the audible play calls to digital data for output to the computer 604 via wireless interfaces 610.

The team sport training system 600 can further include a coach's controller 624 configured to execute a coach interface (e.g., see 1116, FIG. 11). The coach's controller 624 can include a wireless interface 610 configured to communicate with a wireless interface 610 in the computer 604 including a multi-core processor 606. The coach's controller 624 can include a coach console 626 configured to present an opponent play selection interface and team play selection interface.

As described above, various approaches are contemplated for animating the simulated team players.

The inventors contemplate three architectures for simulating players:

1) Predetermined paths represented by uninterrupted animation feeds.

2) Step-wise logic selection of simulated player path and animation.

3) Hybrid logic including animation segments punctuated at intervals by decision points.

Predetermined Path

The predetermined path approach is believed to be the easiest to implement, and may be used for mock-ups and for displaying outcomes of player called play changes, for example. Interactions with the player include starting animation responsive to a player command to start play, and adjustment of perspective to maintain registration of the animation to the practice field. This fairly simple interaction is an improvement in that it can provide an immersive simulation and immediate video feedback as to the outcome of play calls and "audibles."

In the predetermined path approach, the coach can enter a selection that includes selection of the opponent play; good, medium, or poor opponent play; and mental errors in opponent play. In one embodiment, the animations of simulated team players and opponent players are combined in a single animation feed. In another embodiment, the animation of each player is separate. Separate animations can be carried and scaled by sprites whose paths are determined responsive to the coach selections.

In one embodiment, all available simulated player actions are "canned" in that they are called up from memory. In another embodiment, the animations are generated after the coach selection (including opponent play call) and after the player play call, but before the animation runs.

Referring to the embodiment of FIG. 11, in predetermined path logic, the Path Module 1118 selects an entirety of an animation rather than operating in a stepwise manner to select simulated player locations at the next time step. Other portions of the module structure shown in FIG. 11 may operate as described below.

A shortcoming of predetermined paths is that there is relatively limited interaction with the player. For example, nonresponsive simulated opponent players do not adjust to lateral movement of the player or to "staring down" a simulated team player. This can optionally be ameliorated by providing the coach device with control over one or more of the opponent players. In some embodiments, a coach has direct control (e.g., via a joystick or the like) of a selected opponent player. Responsive to "staring down" or poor lateral movement, the coach can cause a consequence using the directly controlled opponent player.

For example, during a training session for an American football player at the quarterback position, nominal routes can be run by the player's receivers by playing a predetermined animation of the nominal routes, and nominal coverages can be run by the opponent team members by playing an animation of the nominal coverages. In an embodiment, the coach may optionally select an animation that represents a suboptimal pass route and/or a suboptimal defensive pass coverage for one or more of the "simulated" players. Selecting a suboptimal (or superoptimal) play animation can be used to train the player to look for secondary and tertiary receivers. Similarly, selecting a superoptimal pass rush by one or more simulated players (or alternatively, suboptimal blocking by one or more simulated players), can call up an animation where the player must respond to being "flushed" from the pocket and scramble to complete a play.

Step-wise logic is believed to be the most difficult to implement in that it places the highest demands on hardware bandwidth and latency. But step-wise logic can also provide the most immediate responsiveness to the player. Step-wise logic is described below in conjunction with FIGS. 10 and 11.

Hybrid Logic

In an approach referred to herein as hybrid logic, a predetermined path is shortened to encompass a duration of a fraction of a second, up to several seconds, during which time (or immediately after) a decision point is reached. At the decision point the currently selected animation may continue or a new animation may be "latched" into the animation flow so as to change behavior of the simulated players.

Figure 7:
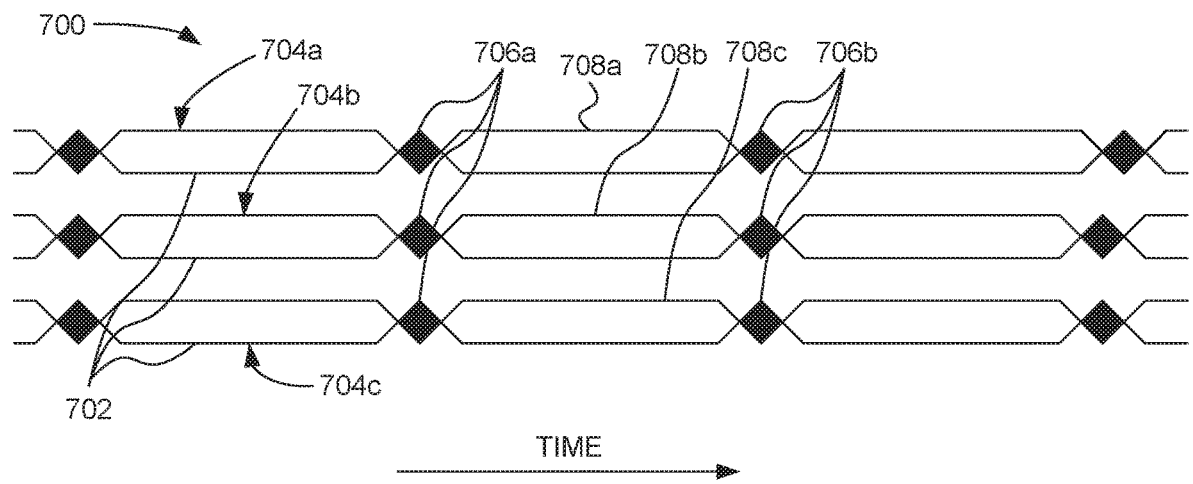
FIG. 7 is a graphical depiction of simulated player animation flow, according to an embodiment.

FIG. 7 is a graphical depiction of simulated player animation flow 700, according to an embodiment using hybrid logic. According to embodiments, play simulations can be driven by a hybrid logic including segments 704 of predetermined animations punctuated by decision points 706 that select a next animation segment 704. In the depiction of FIG. 7, time runs along the horizontal axis. Animation streams 702 each represent an animation of a particular simulated player. A first set of animation segments 704a, 704b, 704c for respective simulated players run concurrently and are displayed on the player's immersive display. After a selected duration, decision point 706a is reached. Depending on whether a new animation is selected the previously selected animation may continue or a new animation may be inserted into each of the respective streams 702. The simulation then proceeds with respective animations 708a, 708b, 708c until a next decision point 706b is reached.

The animation streams and decision points can be synchronous or asynchronous relative to one another. FIG. 7 illustrates a plurality of synchronous animation streams 702 where the segments 704 and decision points 706 occur synchronously for all the streams.

Figure 8:
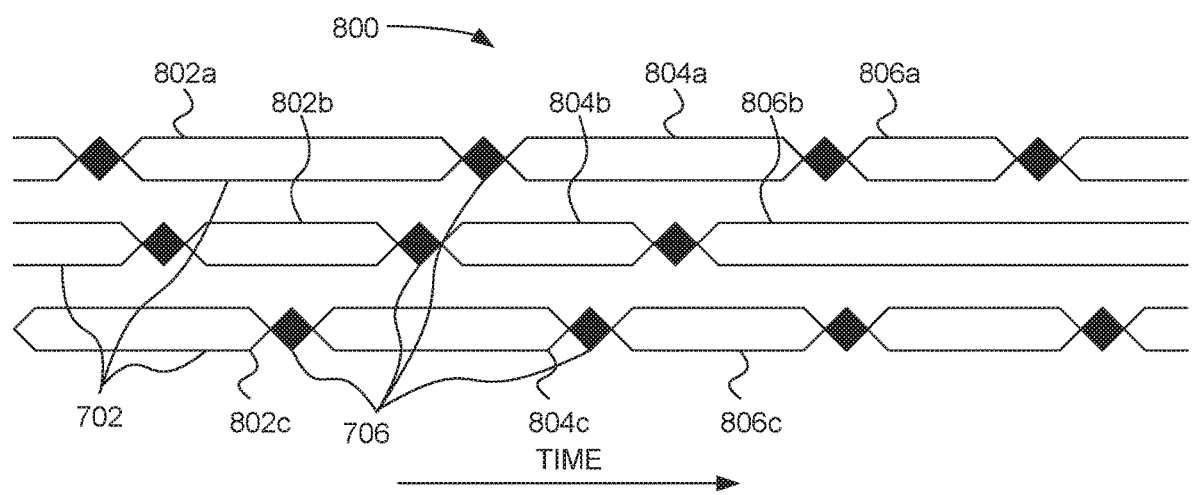
FIG. 8 is a graphical depiction of simulated player animation flow, according to another embodiment.

FIG. 8 is a graphical depiction of simulated player animation flow 800, according to another embodiment using asynchronous animation streams 702. Respective animation segments 802a, 802b, 802c overlap in time but respectively end at decision points 706 asynchronously. Following first decision points 706, the respective streams 702 continue with animation segments 804a, 804b, 804c, which end in subsequent asynchronous decision points 706a, 706b. The animation streams continue with animation segments 806a, 806b, 806c, etc.

The inventors contemplate that asynchronous decision point timing can be used advantageously to limit processor bandwidth demands. This can drive block memory or pointer transfers responsive to a causal condition to be made corresponding to only a subset of simulated players. In an embodiment, decision points 706a, 706b are placed in an instruction cache in an order received such that responses in animation segment selections are smoothly made at the next decision point after decision logic is performed.

Figure 9:
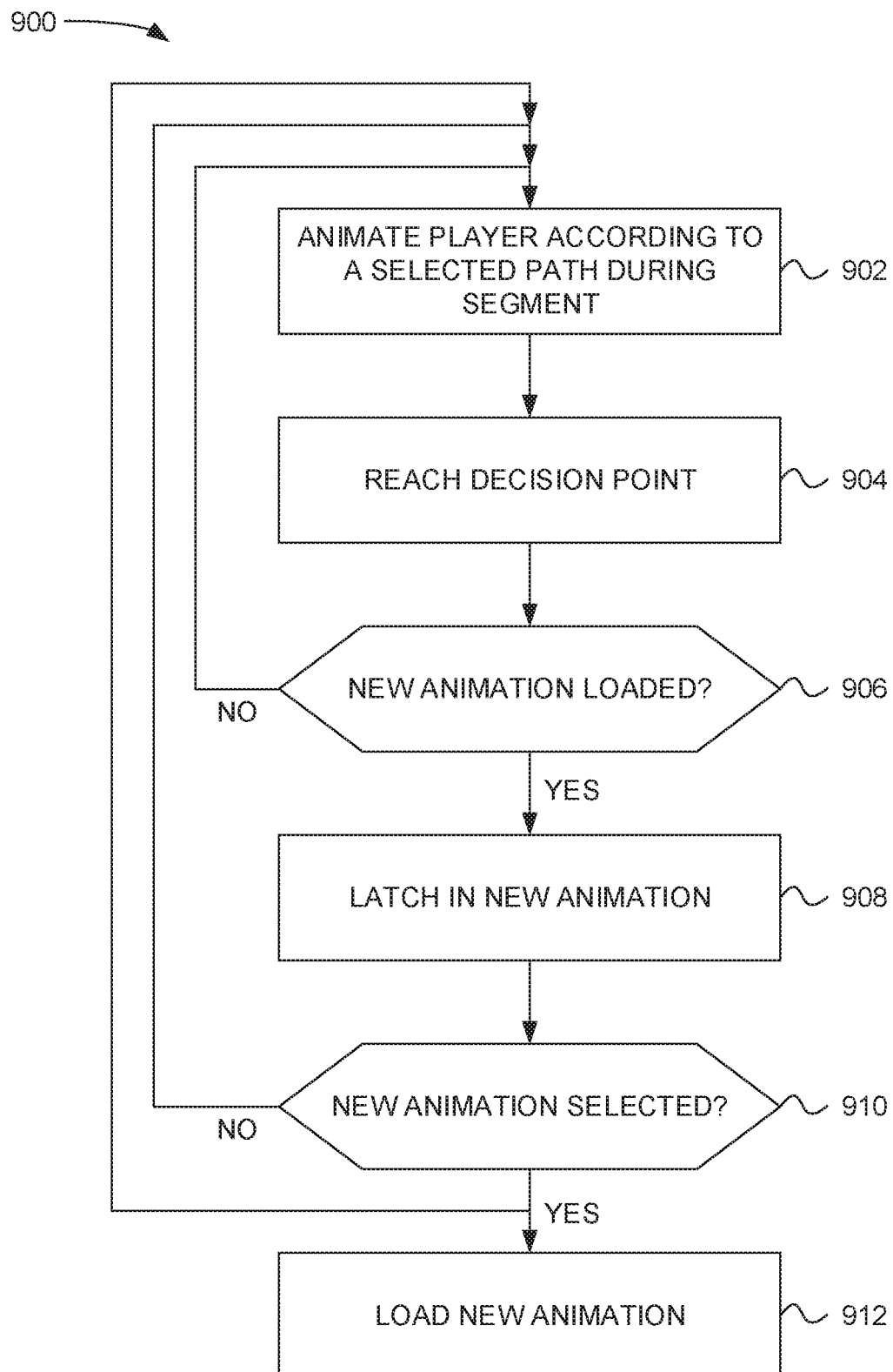
FIG. 9 is a flow chart showing a method for applying animation segments using the animation flow depicted in FIG. 7 or 8, according to an embodiment.

FIG. 9 is a flow chart showing a method 900 for applying animation segments using the animation flow depicted in FIG. 7 or 8, according to an embodiment. Beginning at step 902, an animation segment is played for each animated player, or optionally a single segment including all simulated players. After an interval of time, a decision point is reached, as indicated by step 904. The method proceeds to a decision step 906 where it is determined whether a new animation segment is loaded. If no new animation segment is loaded, the method loops back to step 902 and continues outputting the previous animation segment.

In one embodiment, the animation segments are loaded as binary large objects (BLOBs) in a database table. One cell carries the currently playing animation segment. If a new animation segment is loaded, a decision point cell is loaded with a link to another record in the table, the linked record including another BLOB cell containing the loaded new animation. If no new animation segment is loaded, the decision point cell can either be left blank or can link to the current record, which causes the current animation to loop and continue being displayed.

In addition to the animation itself (read as the BLOB), the animation segment has associated with it a sprite path. The sprite carries the animation across the sprite path for the segment. Movement of the sprite "toward" or "away" from the viewer causes the animation to be "moved" in 3D space such that the animation is scaled, rotated, and parallax adjusted to maintain immersiveness of the display. If, at the decision point, a next animation is not loaded, the sprite path is updated to extrapolate along the previous sprite path. The previous sprite path can include changes in direction.

If, in step 906, it is determined that a new animation segment is loaded, the method proceeds to step 908, wherein the new animation (and associated sprite path) is "latched in." In the example embodiment described above, "latching in" the new animation segment may consist essentially of changing a CODEC read address to correspond to the new linked record containing the new BLOB carrying the new animation segment and the new sprite path, which is linked end-to-end from the previous sprite path. The process loops to step 902, where the next segment is animated.

The process 900 then continues to decision step 910, where it is determined if a new animation is selected. The difference between a "loaded" animation and a "selected" animation has to do with whether an animation segment is ready to be read by the CODEC. The extra step 910 of deciding whether a new animation is selected decouples animation streaming (using a loaded animation) from animation loading (which involves writing the BLOB or a BLOB pointer to the database cell). This can reduce "jerkiness" of the animation as it shifts between animation segments. If a new animation is selected, then the selected animation is loaded into the database table in step 912 concurrently with the process 900 looping back to step 902. In most cases, the newly loaded animation will be switched in during the subsequent loop of the process 900.

Regarding latency, the animation segments 704, 708, 802, 804, 806 are contemplated to be relatively short, between 50 and 500 milliseconds, such that missing a switch at one decision point and delaying it to the next decision point does not result in severe artifacts in the immersive environment. For example, a latch delay across an animation segment duration of 100 milliseconds does not result in a delay in animation that is perceptible to the player. If a segment duration is 500 milliseconds, then a delay would be perceptible, but the resulting animation would simply depict a delayed reaction of half a second. Moreover, a longer segment duration decreases the likelihood that a switch will be missed.

For some embodiments (e.g., where operating hardware and software revisions are not controlled together) it is suggested that decision point instruction caching (including the possible delay between new animation selection and new animation loading), while tempting to use as a tool for creating apparent randomization of simulated player response, should not be used to provide randomization because it is a strong function of processor bandwidth, and hence code portability is reduced. However, for embodiments that are operated on known hardware, such queuing can operate as a "feature" that naturally varies the responsiveness of individual simulated players or groups of simulated players, and makes the simulation feel more "real."

In some embodiments of the hybrid logic approach, the decision points are preset to switch between a preselected progression of animation segments and sprite paths. In this case, the result of the simulation is similar to the result of predetermined path logic. This approach can be run without any real time logical interaction between the simulation and the player. Optionally, the decision points represent points of insertion available for the coach to select an action by a particular simulated player, either a team player or an opponent player. The hybrid logic approach thus provides a tool for the coach to control the actions of one simulated player (e.g., with a joystick) while other simulated players behave according to their predetermined paths. This approach is referred to as manual hybrid logic.

Optionally, the decision points may optionally be somewhat randomized. A pseudo random number generator can be used to select between cells of a database table, as described above, wherein different cells have potentially different linking values to different records carrying or pointing to BLOBs having different animations.

According to an embodiment, locations of simulated teammates and simulated opponent team members can be selected using a randomized change from respective previous paths of the simulated entities. This may be embodied as a database table including all possible paths and animations relative to the previous time animation segment, in combination with a database query that is randomized. By populating the database table according to a desired probability of the next animation segment and making the query random, a most probable sequence of animations and paths (which together constitute the simulated player animation) can be selected, while also randomizing the animation sufficiently to make the simulation realistic.

According to another embodiment, the randomized query can be replaced by a selected determinate query to force a simulated player to follow a path. For example, a coach can select a "no randomization" simulation while teaching the player about an upcoming opponent's defense. In another example, the coach can select a particular opponent player to "fall down" and drop coverage of a receiver on the player's simulated team to teach the player to identify targets of opportunity that typically present themselves from time to time during real football games. In the case of the "fall down" scenario, the selection to fall down can be viewed as a causal function (or causal node in a Bayesian network)—see the description corresponding to FIG. 10, below. The "falling down" scenario, used appropriately, may, over time, improve a player's vision of the field and make him respond better to either physical errors or blown coverages that leave a receiver open. Responsive to a causal "no coverage," a corresponding simulated player teammate (a receiver, for example) can be depicted by an animation including waving hands to indicate "I'm open!"

Figure 10:
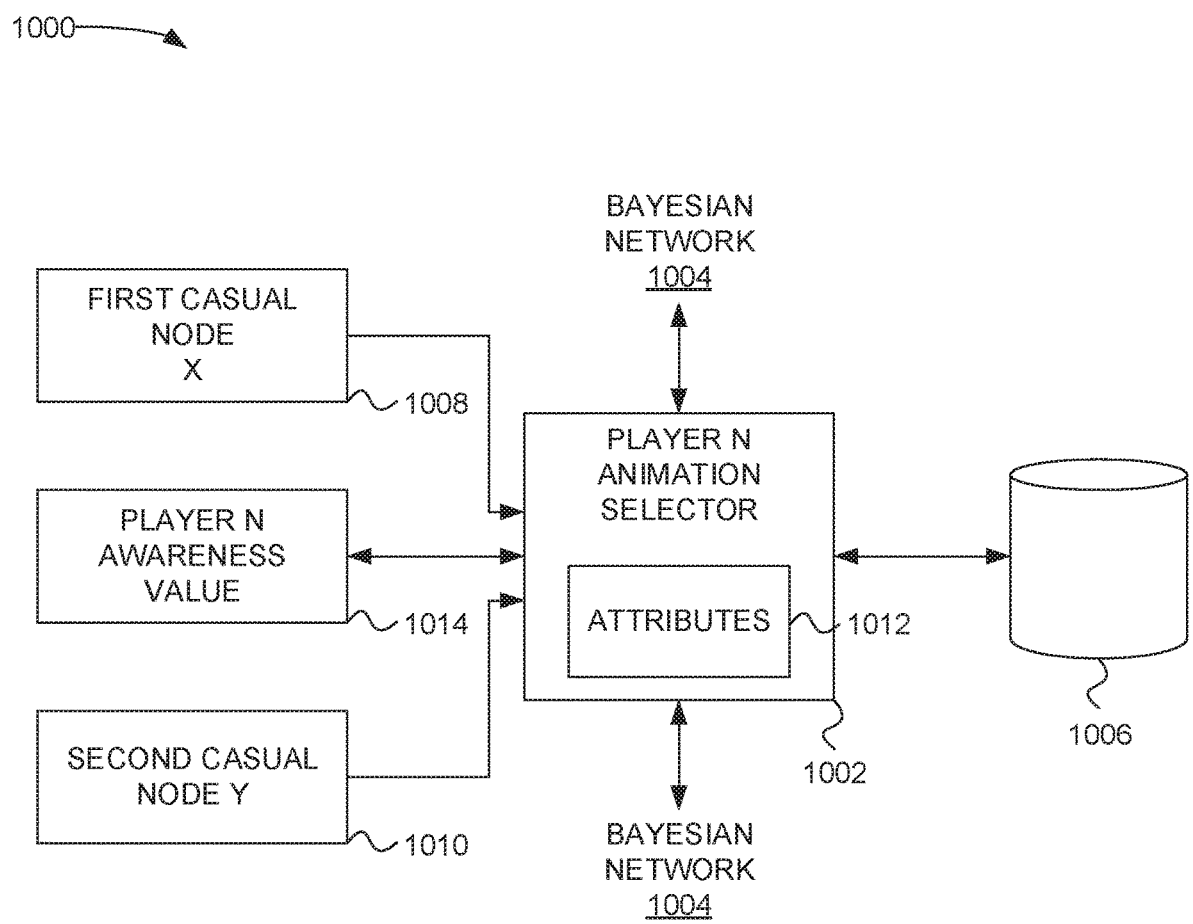
FIG. 10 is a diagram showing a general approach to applying statistical logic to driving simulated player animation, according to an embodiment.

In another approach, referred to as "automatic hybrid logic" or "artificial intelligence (AI) hybrid logic," AI logic determines insertion point instructions. FIG. 10 is a diagram showing a general approach 1000 to applying statistical logic (AI) to driving simulated player animation, according to an embodiment. The approach 1000 shown in FIG. 10 is optional. The approach 1000 shown in FIG. 10 can be applied to either the hybrid logic approach described here, and/or can be applied to stepwise logic described below.

In the automatic hybrid logic approach, each decision point can operate similarly to the step-wise logic described in conjunction with FIG. 11, and each intervening animation segment can work the same as the predetermined path approach described above. Compared to step-wise logic, processor bandwidth requirements are reduced because it is not critical to latch in a new animation at each decision point. Compared to the predetermined path approach, the simulation can be responsive to each of coach, player, and play object position input (which act as causal nodes 1008, 1010 in a Bayesian network 1004).

Referring to FIG. 10, each animated player (plus optionally, animated officials, and animated play object (puck, ball, football)) is represented as a node 1002 in a Bayesian network 1004 that are linked together. A segment path and/or animation applied to one animated object is represented by a data value that it communicated, eventually, from the object's corresponding node to all other nodes in the network. The function of the node 1002 is to select the next animation segment and corresponding sprite path from a physical memory 1006, the selection thus serving as an animation module (also shown, according to an embodiment, as 1124 in FIG. 11.) In this architecture, the behavior of one node will ripple across other nodes according to a probabilistic function that is determined by weighting coefficients between nodes.

Special Bayesian nodes 1008, 1010 are referred to as causal nodes. The causal nodes 1008, 1010 do not respond to other Bayesian nodes, but rather provide forcing functions that drive the behavior of individual Bayesian nodes 1002, and thereby the Bayesian network 1004. Examples of causal nodes 1008, 1010 include coach input, player sensing, and play object sensing. Since the sensed behavior of the player is not directly driven by the Bayesian network (although one could argue that in responding to the simulation, the player can be considered to "simulate" a Bayesian node), the player node 1008 has one-way information flow into the Bayesian network 1004. Similarly, coach input or ball/puck position (indicated generically as a second causal node 1010) correspond to physical inputs that do not respond to the Bayesian network 1004 and are associated with one-way information flow, shown by the single ended arrows between the causal node 1010 and Bayesian node 1002.

Each node 1002 has, associated with it, several attributes 1012 that determine its behavior, and hence, its animation segment and path selection from the physical memory 1006, as well as its responsiveness to other nodes in the Bayesian network 1004 and to causal nodes 1008, 1010. Selected attributes and their functions are listed in Table 1. Not shown are randomizing variables and attributes having a lower affect on the overall simulation.

Some of the attributes may be calculated by a single or series of physical agility tests. For example, quickness can be determined by the 20-yard short shuttle administered at the NFL Combine. The 3-cone is also a measurement of quickness and change of direction and can be used to calculate agility. The combination of the short shuttle time and the 3-cone time can be combined to calculate quickness. Power can be calculated from the 40-yard dash time and body weight and/or from the vertical jump and body mass.

While the attributes listed have values corresponding to measured or observed performance, it will be understood that the form of the attributes used in the model 1000 can vary significantly, depending on developer preference. Generally, the attributes listed as "affecting" behavior are expressed as coefficients selected to vary the interaction of nodes 1002 in the Bayesian network 1004. Attributes listed as "determining" behavior, on the other hand, are typically expressed as values corresponding to memory addresses or database table cells, which correlate to where the particular attributes are stored.

The attributes listed in Table 1 can be chosen to be representative of any player at a given position, at a given level of play. Such generic attributes allow the applicants to offer reasonably priced virtual team sports trainers to lower level organizations that may have limited budgets (e.g. college varsity, club, or high school sports organizations). Optionally, a coach module can include a capability of substituting a simulated player having a different set of attributes compared to a nominal generic attribute.

TABLE 1

AI Node Attributes

| Attribute | Function |
|---|---|
| Identity | Determines jersey number, depicted likeness, and depicted voice |
| Assignment | Determines assigned action (path and animation) responsive to play called |
| Height | Determines animation characteristic |
| Arm Length | Determines animation characteristic, affects the play object catching or blocking radius |
| Range | Calculated from arm length and vertical jump, affects ability to reach or block play objects |
| Responsiveness | Affects timing and gain of changes to path and animation responsive to other nodes |
| Speed | Affects maximum travel distance per time step |
| Quickness | Affects acceleration |
| Agility | Affects avoidance of actions by other nodes |
| Skill | Affects dexterity and gain in affecting other nodes including accuracy of play object handling |
| Strength | Affects gain of contacting interactions with other nodes |
| Durability | Affects ability of the depicted player to survive collisions with other paths |
| Power | Affects resistance to contacting interactions |

In another embodiment, the attributes listed in Table 1 are selected to correspond to particular individuals that play for a real opponent team. In the case of American professional football, for example, attributes of individual athletes may be found at Pro Football Forecast/Premium Stats, which is available on the Internet. Measurable attributes of individual athletes are also generated at the NFL Combine, in which the performance of prospective college athletes is measured in various drills. The drills measured at the NFL Combine include 40 yard dash (sub-timed at 10, 20, and 40 yards), Vertical Jump (height), Standing Broad Jump, Bench Press (repetitions at 225 lbs), 20 yards short shuttle (5, 10, 5 yards), 60 yards long shuttle (5, 10, 15 yards), 3-Cone triangular change of direction. In addition, physical attributes including height, weight, arm length, hand span, and various flexibility measurements including flexibility of hamstring, shoulders, and back are measured and recorded.

For individuals who have published NFL Combine attributes, at least some of the attributes listed in Table 1 can be calculated therefrom as described above.

At each decision point, input from the player sensors (see FIG. 6, 616, 622) can function as the causal node 1008 in the Bayesian network that models the play of respective simulated players 1002. Similarly, coach input ("trip now") can function as the causal node 1010 in the Bayesian network 1004. Similarly, a detected physical play object (puck, ball, football) location and/or trajectory functions as the causal node 1010 in the Bayesian network 1004. It is contemplated that at some decision points, no out-of-tolerance values from the player or coach will exist and the animation will proceed seamlessly forward through a next predetermined (nominal) animation segment, the action being determined by the node attributes 1012 and interactions with other nodes of the Bayesian network 1004. At some decision points, a value at the causal node 1008, 1010 will drive a change in path for one or more simulated players.

In one embodiment, each node 1002 (simulated player) has associated with it, for the duration of each animation segment, an "awareness" value 1014. The awareness value can select responsiveness to causal nodes 1008, 1010. The awareness value can be selected to be covariant with a simulated player's unobstructed view of the player and/or the play object, where the better the view, the faster the response of the simulated entity to player/play object actions. View obstruction can be calculated based on whether the presentation module shows an animation of the simulated player's facemask in the current perspective, for example. In an American football example, varying simulated player awareness that results from whether the simulated player is animated to be "looking into the backfield" or animated to be "looking at the receiver" (or obstructed by simulated linemen) creates a realistic randomization that, when combined with a player "responsiveness" attribute, tends to more realistically simulate the play of particular positions and/or individuals (as AI).

According to an embodiment, locations of simulated teammates and simulated opponent team members on a practice field at each time step or decision point are probabilistically determined according to the Bayesian network 1004 responsive to variables including respective (team and opponent) called plays, respective previous location paths, a plurality of physical attributes of each simulated teammate and opponent team player, a latent randomization variable, detected ball position, and detected player perspective. Optionally, the plurality of physical attributes can be transformed into a hidden physical asset variable. At a moment in time when the ball is released by the player, the use of the player perspective as an input variable can be reduced by reducing a player perspective network coefficient to near zero.

According to an embodiment, the physical attributes can be modified by a coach to obtain a coaching objective. For example, during early-in-the-week drills, the physical assets of the player's simulated teammates can be "dialed up" and/or the physical attributes of the simulated opponent team members can be "dialed back" to enable the player to see the results of his actions in an idealized setting. Midweek, the coach can "dial up" the physical assets of the simulated opponent team members and/or "dial back" the physical attributes of the player's simulated teammates in order to stress the player to higher performance. Late in the week, the coach can use realistic physical attributes intended to present the most realistic results of the player's decisions.

According to an embodiment, the time steps used during a simulation correspond to real time to give the player a realistic sense of speed of the game. According to another embodiment, the time steps of the simulation can be sped up, slowed down, stopped, or "rewound" responsive to a coach's selection. This can be used to "walk through" a play to teach the player about pass routes and coverages, defensive opponent team alignment, disguises, line stunts, and/or blitz pressure and the like. Similarly, for defensive player training, pre-snap formation, motion and/or alignment can be demonstrated to teach defensive keys. Optionally, speeding up or slowing down the time steps relative to real time can be used to make the simulation easier, more difficult, or realistic to achieve desired psychological effects.

According to another embodiment, at least a portion of a sequence of simulated teammate locations and simulated opponent player locations is determined a priori, and loaded into memory responsive to a received player play call and an opponent play call. During the subsequent simulation, the a priori locations of each player are updated according to real time steps responsive to a snap of the ball. For a priori path calculation, the player's perspective can be replaced by a simulation of the player's perspective and the ball path can be replaced by a simulation of the ball path.

Step-Wise Logic

As indicated above, the description associated with FIG. 10 is applicable to either Automatic Hybrid or Step-Wise logic. The difference between the two may vanish as the duration of the animation segments 704, 708 (FIG. 7), 802, 804, 806 (FIG. 8) is reduced.

FIG. 11 is a state diagram of a computer program 1100 configured to provide a virtual team sport training experience to a player, according to an embodiment. The description associated with FIG. 11, for simplicity and ease of understanding, refers to American or Canadian football. It will be understood that the detailed description and diagram of FIG. 11 is applicable to any team sport that uses sets, plays, alignments, etc. in offensive and defensive relationships and uses a play object such as a ball (e.g., football) or puck.

Referring to FIGS. 11 and 6 a football training system 600 includes computer-executable instructions corresponding to modules 1100 carried by a non-transitory computer-readable medium. The computer-executable instructions 1100 include a presentation module 1102 configured to output a first person view of an animation of an opponent football team to a player 1104 corresponding to an instantaneous player perspective. A detection module 1106 is configured to receive location and gaze direction of the player 1104, the location and gaze direction together comprising the perspective. The detection module 1106 is further configured to receive player commands and to output the instantaneous perspective to the presentation module 1102. A tracking module 1108 is configured to receive a sequence of the player perspectives from the detection module 1106. An opponent play module 1112 is configured to receive an opposing play call from a coach 1114 via a coach interface 1116, select the called opponent play and opposing player alignments from an opponent play library 1110, and output the selected opponent play and opposing player alignments to a path module 1118. The path module 1118 is configured to determine sprite paths responsive to the opposing player alignments, the selected opponent play, opposing player attributes, and the player commands. An animation module 1124 is configured to output sprite movements corresponding to the sprite paths to the presentation module 1102.

Optionally, the functions of the path module 1118 and animation module 1124 can be combined, as described above in conjunction with FIGS. 7-10.

The team sport training system 600 including computer-executable instructions 1100 carried by a non-transitory computer-readable medium can further include a computer 604 configured to execute at least a portion of the computer-executable instructions 1100. The computer 604 can further include a computer-readable medium carrying the opponent play library 1110 configured to hold opponent plays and opposing player alignments, a sprite library 1120 configured to hold a plurality of sprite images corresponding to opposing players and an attribute library 1122 configured to hold a plurality of opposing player attributes. The opponent play library 1110 can include data corresponding to opponent plays run in past football games played by the opponent and data corresponding to play disguises shown by the opponent in past football games.

The sprite library 1120 can include video frames for animating specific opposing players. The attribute library 1122 can include data corresponding to play performance attributes corresponding to specific opposing player capabilities and data corresponding to at least one of player height, player weight, player strength, player speed, or player lateral quickness.

The animation module 1124 can be configured to output a large video animation corresponding to player location. The presentation module 1102 can be configured to cause display of a portion of the large video animation, the portion being selected as a function of player gaze direction.

The computer-executable instructions 1100 can further include a grade module 1126 configured to determine a player grade responsive to player gaze, player locations, player commands, and sprite paths.

The presentation module 1102 can be further configured to output a first person view of an animation of the player's football team.

The detection module 1106 can further include an audio interface configured to receive audible player commands.

The computer readable instructions can further include a team play library 1128 and a team play module 1130 configured to receive team play selections from the coach interface 1114, read a selected team play from the team play library 1128, and output the selected team play to the path module 1118. The team play module 1130 can be further configured to receive player commands including an audible play selection from the detection module, read the audible play selection from the team play library, and output the audible play selection to the path module.

The tracking module 1108 can be configured to record the player location, player gaze direction, and player commands.

The detection module 1106 can be configured to receive locations corresponding to full scale locations corresponding to a portion of a football field. The portion of the football field can correspond at least to a tackle box in width and to at least 10 yards in depth.

The path module 1118 can be configured to determine sprite paths corresponding to the selected play, the player attributes, a sequence of player locations and/or a sequence of player gaze directions. Additionally or alternatively, the path module 1118 can be configured to determine sprite paths corresponding to a sequence of player locations and gaze directions by simulating opposing player responses to the player locations and gaze directions according to one or more opposing player attributes including speed and lateral quickness.

The computer-executable instructions can further include a superposition module 1132 configured to parse a portion of a real image captured by the video camera and to output the parsed portion of the real time image to the presentation module 1102 for superposition over the immersive display 614. For example, the superposition module 1132 can be configured to compare the real image captured by the video camera to a stored image of a practice facility and remove portions of the image that correspond to the stored image of the practice facility. The superposition module 1132 can be configured to output an image of a real football to the presentation module 1102 and can be configured to stop outputting the image of the real football when the player has received a snap. The animation module 1124 can be configured to start animating an image of a football at or after release of the real football by the player.

The coach's controller 624 can include an interface to a grade module 1126. The grade module 1126 can include information corresponding to player reaction time, player audible correctness, and player speed. The grade module can optionally include a facility for "walking through" a previous training instance.

According to an embodiment, a coach can choose to simulate or replay a player's path including inserting an animation or a recorded 3D video of the player. This can allow the player to step aside and "watch himself" from a third person perspective in the context of a simulated play. Such a third person view can provide a visual representation (optionally in stop motion, slow motion, etc.) so as to receive the coach's input on his positioning, his reads, his positioning, his footwork, his speed, or the like. For example, the coach and the player can experience the third person view of a simulated opposing team member. Optionally, the animation can be selected to cause the simulated teammates and opposing team players to "freeze" in an instant of time being examined, or the simulated players can be animated to stand in a relaxed position as if they were real players participating in a physical drill, but waiting while the coach provides instruction.

According to an embodiment, using the grade module 1126, a coach can choose to simulate a nominal player's path using an animation superimposed over a recorded player's path. This can be used to provide a third person view to the player for the purpose of receiving instruction from the coach regarding a difference between desired performance (shown by the animation) and actual performance of the player (shown by the recorded player's path) within the simulation environment.

The computer-executable instructions 1100 can further include an opposing player module 1134 configured to receive input from the coach via the coach interface 1116 and to select an attribute of an opposing player. The opposing player module 1134 can be configured to select a sprite corresponding to an opposing player. Additionally or alternatively, the opposing player module 1134 can be configured to select an attribute of an opposing player to override a previous attribute.

Referring to all the FIGS., According to an embodiment, the system may operate in a "drill mode" that includes fewer than all the simulated players on both teams. In American or Canadian football, for example, it may be useful to simulate, for a quarterback, only the (offensive) team receivers and the (defensive) opponent team defensive backfield when running passing drills (which may be referred to colloquially as a 7-on-7 drill. Similarly, it may be useful to simulate only the (team) offensive line, (opponent team) defensive line, and (opponent team) linebackers when running rushing drills (which may be referred to colloquially as a 9-on-7 drill). It may be noted that some embodiments may include only a drill-mode and not include an "All-22" simulation.

While computer methods are described herein, it will be understood that "a non-transitory computer readable medium carrying instructions for executing" the described methods also falls within the scope of this application. A non-transitory computer readable medium can include a physical magnetic medium (such as in a spinning disk drive), a physical optical medium (such as in a CD-ROM or DVD surface), or a physical computer memory such as RAM, ROM, etc.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A passer training system comprising:
a physical practice field;
a physical football movable by a passer within the physical practice field;
a position sensing system positioned relative to the physical practice field and configured to track:
 a physical location of the physical football; and
 a physical trajectory of the physical football when thrown by the passer within the physical practice field, the physical trajectory of the physical football being tracked using a system of one or more sensors that detect the physical location of the physical football as it moves along the physical trajectory;
an immersive computer display worn by the passer and comprising:
 a sensor for determining in real time a head position of the passer; and a head-mounted display obscuring a view of the passer and configured to display to the passer a viewable portion of a training animation, the viewable portion corresponding to the head position of the passer; and a processor in communication with the position sensing system, the processor configured to:

generate the training animation, the training animation including animation segments comprising pre-play alignments displayed to the passer via the immersive computer display, at least one virtual offensive player, and at least one virtual defensive player, the at least one virtual offensive player being simulated to execute a selected team play and the at least one virtual defensive player being simulated to execute a selected opponent play;

position a virtual football within the training animation based on the physical location tracked using the position sensing system;

position the at least one virtual offensive player and the at least one virtual defensive player within the training animation based on the position of the virtual football;

animate the at least one virtual offensive player and the at least one virtual defensive player to respectively execute the selected team play and the selected opponent play;

determine a virtual trajectory for the virtual football based on the physical trajectory tracked as determined based upon the velocity and angle of release of the physical football using the position sensing system;

animate a flight of the virtual football within the training animation using the virtual trajectory;

animate the at least one virtual defensive player with new animation segments to react in real-time to the detected physical location of the physical football, and the velocity and angle of release of the physical football, as it moves along the physical trajectory so as to alter the previously selected opponent play based upon artificial intelligence hybrid logic applying statistical logic to alter the previously selected opponent play as defined by the animation segments of the training animation; and cause the viewable portion of the training animation to be displayed on the immersive computer display to provide the passer a realistic indication of whether a reaction of the passer was correct or not.

2. The passer training system of claim 1, wherein:
the virtual trajectory of the animated flight of the virtual football corresponds to the physical trajectory during a first portion of the animated flight of the virtual football; and
the virtual trajectory of the animated flight of the virtual football is determined independent of the physical trajectory during a second portion of the animated flight of the virtual football following the first portion.

3. The passer training system of claim 1, wherein the processor is further configured to update the position of the virtual football based on the tracked physical location of the physical football when the physical football is moved by the passer.

4. The passer training system of claim 1, wherein:
the virtual player is a virtual receiver animated within the training animation; and
a route of the virtual receiver is determined by the physical trajectory tracked using the position sensing system.

5. The passer training system of claim 4, wherein:
the processor is further configured to determine if a football pass to the virtual receiver is completed based on the physical trajectory tracked using the position sensing system; and
the immersive computer display is configured to display a completed football pass animation in response to the determination that the football pass is completed.

6. The passer training system of claim 4, wherein:
the processor is further configured to determine if a football pass to the virtual receiver is incomplete based on the physical trajectory tracked using the position sensing system; and
the immersive computer display is configured to display an incomplete football pass animation in response to the determination that the football pass is not completed.

7. The passer training system of claim 1, wherein the immersive computer display is wearable on a head of the passer within the physical practice field.

8. The passer training system of claim 7, wherein the immersive computer display is incorporated into a helmet worn by the passer.

9. The passer training system of claim 1, wherein the sensor for determining in real time the head position of the passer provides an indication as to a gaze direction of the passer and the processor animates the virtual player to react in real-time to the gaze direction of the passer.

10. A football training system comprising:
a training area;
a football throwable by a player within the training area;
an immersive head-mounted training device configured to be worn by the player and comprising:
  a head-mounted display worn by the player and configured to obscure a view of the player; and
  one or more first sensors configured to determine in real time a viewing angle of the player and a player location of the player with respect to the training area;
a position sensing system disposed relative to the training area and configured to:
  determine a ball location of the football relative to the training area; and
  track a physical trajectory of the football when thrown in the training area, the physical trajectory of the football being tracked using one or more second sensors that detect the ball location of the football as it moves along the physical trajectory; and
a processor in communication with the head-mounted display and the position sensing system, the processor configured to:
  generate a training animation, the training animation including animation segments comprising pre-play alignments displayed to the passer via the immersive head-mounted display, at least one virtual offensive player, and at least one virtual defensive player, the at least one virtual offensive player being simulated to execute a selected team play and the at least one virtual defensive player being simulated to execute a selected opponent play;
  position a virtual football within the training animation based on the physical location tracked using the position sensing system;
  position the at least one virtual offensive player and the at least one virtual defensive player within the training animation based on the position of the virtual football;

animate the at least one virtual offensive player and the at least one virtual defensive player to respectively execute the selected team play and the selected opponent play;

select a portion of a training animation that corresponds to the viewing angle of the player;

animate a flight of a virtual football within the selected portion of the training animation based a virtual trajectory for the virtual football based on the physical trajectory tracked as determined based upon the velocity and angle of release of the physical football using the position sensing system;

animate the at least one virtual defensive player with new animation segments to react in real time to the detected ball location of the physical football and the velocity and angle of release of the physical football, as it moves along the physical trajectory so as to alter the previously selected opponent play based upon artificial intelligence hybrid logic applying statistical logic to alter the previously selected opponent play as defined by the animation segments of the training animation; and cause the head-mounted display to render the selected portion of the training animation.

11. The football training system of claim 10, wherein:
the processor determines a virtual trajectory of the virtual football in response to the football being thrown in the training area;
the virtual trajectory corresponds to the physical trajectory during a first portion of a pass; and
the virtual trajectory is determined independent of the physical trajectory during a second portion of the pass following the first portion.

12. The football training system of claim 10, wherein:
the processor is configured to determine if a throw corresponds to a complete pass based on the physical trajectory; and
the processor is configured to generate a completed pass animation in response to the determination that the throw corresponds to a completed pass.

13. The football training system of claim 10, wherein the position sensing system comprises at least one of:
a video camera;
a wireless transmitter; or
a wireless receiver.

14. The football training system of claim 10, wherein the one or more first sensors configured to determine in real time a head position of the player providing an indication as to a gaze direction of the player and the processor animates the virtual player to react in real-time to the gaze direction of the player.

15. A passer training system comprising:
a physical practice field;
a physical football movable by a passer within the physical practice field;
an immersive computer display configured to be worn by the passer and comprising:
a sensor configured to determine in real time a head position of the passer; and
a head-mounted display worn by, and obscuring a view of, the passer and configured to display a viewable portion of a training animation that corresponds to the head position of the passer;
a position sensing system comprising one or more sensors configured to track in real time a position of the physical football within the physical practice field; and
a processor in communication with the position sensing system and the immersive computer display, the processor configured to:
generate a training animation, the training animation including animation segments comprising pre-play alignments displayed to the passer via the immersive head-mounted display, at least one virtual offensive player, and at least one virtual defensive player, the at least one virtual offensive player being simulated to execute a selected team play and the at least one virtual defensive player being simulated to execute a selected opponent play;
position a virtual football within the training animation based on the physical location tracked using the position sensing system;
position the at least one virtual offensive player and the at least one virtual defensive player within the training animation based on the position of the virtual football;
animate the at least one virtual offensive player and the at least one virtual defensive player to respectively execute the selected team play and the selected opponent play;
determine a virtual trajectory of the virtual football based on the tracked position of the physical football after it has been thrown by the passer based upon the velocity and angle of release of the physical football using the position sensing system;
animate a path of the virtual football based on the virtual trajectory;
animate the at least one virtual defensive player with new animation segments in real time to react to the physical position of the physical football and the velocity and angle of release of the physical football, as it moves along the physical trajectory so as to alter the previously selected opponent play based upon artificial intelligence hybrid logic applying statistical logic to alter the previously selected opponent play as defined by the animation segments of the training animation; and
instruct the head-mounted display to render a selected portion of the training animation based on the head position of the passer.

16. The passer training system of claim 15, wherein the processor is configured to initiate the training animation based on a detected motion of the physical football.

17. The passer training system of claim 15, wherein:
the virtual player is a virtual receiver; and
animation of the virtual receiver corresponds to one of a completed pass animation or an incomplete pass animation based on the virtual trajectory of the virtual football.

18. The passer training system of claim 15, wherein:
the position sensing system is configured to track a passer location of the passer relative to the physical practice field;
the processor is configured to animate a virtual opposing player; and
the animation of the virtual opposing player is based, in part, on the passer location.

19. The passer training system of claim 15, wherein the sensor configured to determine in real time the head position of the passer providing an indication as to a gaze direction of the passer and the processor animates the virtual player to react in real-time to the gaze direction of the passer.

* * * * *